US011146997B2

(12) United States Patent
Sayenko et al.

(10) Patent No.: US 11,146,997 B2
(45) Date of Patent: Oct. 12, 2021

(54) METHOD AND DEVICE FOR PERFORMING HANDOVER IN COMMUNICATION SYSTEM

(71) Applicant: Samsung Electronics Co., Ltd, Suwon-si (KR)

(72) Inventors: Alexander Sayenko, Seoul (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 16/603,564

(22) PCT Filed: Apr. 9, 2018

(86) PCT No.: PCT/KR2018/004146
§ 371 (c)(1),
(2) Date: Oct. 7, 2019

(87) PCT Pub. No.: WO2018/186721
PCT Pub. Date: Oct. 11, 2018

(65) Prior Publication Data
US 2021/0092651 A1   Mar. 25, 2021

(30) Foreign Application Priority Data
Apr. 7, 2017 (KR) .......................... 10-2017-0045465

(51) Int. Cl.
*H04W 36/00* (2009.01)
*H04W 76/30* (2018.01)
(Continued)

(52) U.S. Cl.
CPC ....... *H04W 36/0055* (2013.01); *H04W 36/04* (2013.01); *H04W 56/001* (2013.01); *H04W 72/042* (2013.01); *H04W 76/30* (2018.02)

(58) Field of Classification Search
CPC .......... H04W 36/0055; H04W 56/001; H04W 72/042; H04W 76/30; H04W 36/04
See application file for complete search history.

(56) References Cited

U.S. PATENT DOCUMENTS 9,749,935 B2   8/2017   Li et al.
9,820,332 B2   11/2017  Lee et al.
(Continued)

FOREIGN PATENT DOCUMENTS

CN   101616450 A   12/2009
CN   102378189 A   3/2012
(Continued)

OTHER PUBLICATIONS

ZTE Corporation, 3GPP TSG-RAN WG2 Meeting #94, Apr. 11-15, 2016, R2-163863, 35 pages.
(Continued)

*Primary Examiner* — Brenda H Pham (57) ABSTRACT

Disclosed is a 5G or pre-5G communication system for supporting a data transmission rate higher than that of a 4G communication system such as an LTE. A method of a terminal according to the present invention comprises: receiving a signal from a primary cell by using a first RF chain and receiving a signal from a second cell by using a second RF chain; deactivating the secondary cell in case of receiving a message for indicating a handover from the primary cell; performing a synchronization with a target cell by using the second RF chain while transmitting and receiving a signal with the primary cell by using the first RF chain; and receiving the signal from the target cell by using the second RF chain after performing the synchronization.

12 Claims, 8 Drawing Sheets

(51) Int. Cl.
*H04W 36/04* (2009.01)
*H04W 56/00* (2009.01)
*H04W 72/04* (2009.01)

(56) References Cited

U.S. PATENT DOCUMENTS

| | | | |
|---|---|---|---|
| 10,390,250 | B2 | 8/2019 | Yang et al. |
| 2003/0190915 | A1 | 10/2003 | Rinne et al. |
| 2011/0194530 | A1 | 8/2011 | Tinnakomsrisuphap et al. |
| 2013/0182657 | A1 | 7/2013 | Sun et al. |
| 2013/0331077 | A1* | 12/2013 | Mucke .............. H04W 76/30 455/418 |
| 2014/0204902 | A1 | 7/2014 | Maltsev et al. |
| 2014/0274062 | A1 | 9/2014 | Centonza et al. |
| 2015/0181483 | A1 | 6/2015 | Tabet et al. |
| 2015/0223135 | A1 | 8/2015 | Ratasuk et al. |
| 2015/0264621 | A1 | 9/2015 | Sivanesan et al. |
| 2016/0249307 | A1 | 8/2016 | Thangarasa et al. |
| 2018/0206147 | A1 | 7/2018 | Lee et al. |

FOREIGN PATENT DOCUMENTS

| | | |
|---|---|---|
| CN | 104054387 A | 9/2014 |
| CN | 104641699 A | 5/2015 |
| CN | 105981442 A | 9/2016 |
| KR | 10-2013-0103443 A | 9/2013 |
| WO | 2010/126256 A2 | 11/2010 |
| WO | 2013/106670 A1 | 7/2013 |
| WO | 2014/054999 A1 | 4/2014 |
| WO | 2016/021821 A1 | 2/2016 |
| WO | 2016/153286 A1 | 9/2016 |
| WO | 2016021821 * | 11/2016 |
| WO | 2017/007151 A1 | 1/2017 |

OTHER PUBLICATIONS

CATT, "Handover for Carrier Aggregation", 3GPP TSG RAN WG2 Meeting #66bis, Jun. 29-Jul. 3, 2009, R2-093722, 3 pages.

InterDigital Communications, "Inter-cell and Inter-node UE RRC Driven Mobility in NR", 3GPP TSG-RAN WG2 #97, Feb. 13-17, 2017, R2-1701194, 3 pages.

MediaTek Inc., et al., "Mobility Enhancement for '0ms' interruption", 3GPP TSG-RAN WG2 NR, Jan. 17-19, 2017, R2-1700897, 5 pages.

Supplementary European Search Report dated Nov. 15, 2019 in connection with European Patent Application No. 18 78 0719, 10 pages.

International Search Report dated Jul. 17, 2018 in connection with International Patent Application No. PCT/KR2018/004146, 2 pages.

Written Opinion of the International Searching Authority dated Jul. 17, 2018 in connection with International Patent Application No. PCT/KR2018/004146, 6 pages.

Office Action dated Jun. 2, 2021 in connection with Chinese Patent Application No. 201880023856.7, 17 pages.

* cited by examiner

METHOD AND DEVICE FOR PERFORMING HANDOVER IN COMMUNICATION SYSTEM

CROSS-REFERENCE TO RELATED APPLICATIONS

This application is a 371 of International Application No. PCT/KR2018/004146 filed on Apr. 9, 2018, which claims priority to Korean Patent Application No. 10-2017-0045465 filed on Apr. 7, 2017, the disclosures of which are herein incorporated by reference in their entirety.

BACKGROUND

1. Field

The disclosure relates to a communication system and, more particularly, to a method and device for performing a handover in a communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the terminal may be associated with a cell to exchange data with a radio network. Because the cell has limited coverage, the terminal may form re-association with another cell according to the coverage when moving. That is, the terminal that is connected to a cell and transmits/receives a signal may be disconnected from the cell and then connected to another cell. This process may be referred to as a handover. In this case, a currently connected cell may be referred to as a serving cell or a source cell, and a cell to which the terminal is newly connected may be referred to as a target cell.

The handover does not occur immediately and is performed through certain steps. Specifically, the terminal may terminate communication with the serving cell, synchronize with the target cell, and tune an RF receiver to the target cell. In addition, after performing the handover process, the terminal may transmit a handover completion message to the target cell.

Therefore, data transmission is interrupted during the handover, causing the degradation of performance. Thus, there is a need for a method of solving this problem.

SUMMARY

In order to solve the above-described problem, the disclosure proposes a method for performing a synchronization with a target cell by using different RF chains without interrupting signal transmission/reception with a serving cell when a terminal has two or more RF chains.

According to the disclosure, a method of a terminal includes receiving a signal from a primary cell by using a first RF chain and receiving a signal from a secondary cell by using a second RF chain, deactivating the secondary cell in case of receiving a message indicating a handover from the primary cell, performing a synchronization with a target cell by using the second RF chain while transmitting and receiving a signal to and from the primary cell by using the first RF chain, and receiving a signal from the target cell by using the second RF chain after performing the synchronization.

According to the disclosure, a terminal includes a transceiver transmitting and receiving a signal; and a controller configured to receive a signal from a primary cell by using a first RF chain, to receive a signal from a secondary cell by using a second RF chain, to deactivate the secondary cell in case of receiving a message indicating a handover from the primary cell, to perform a synchronization with a target cell by using the second RF chain while transmitting and receiving a signal to and from the primary cell by using the first RF chain, and to receive a signal from the target cell by using the second RF chain after performing the synchronization.

According to the disclosure, in case of having two or more RF chains, a terminal performs a synchronization with a target cell by using different RF chains without interrupting signal transmission/reception with a serving cell. It is therefore possible to prevent the degradation of performance due to communication interruption for a certain time.

DETAILED DESCRIPTION

Now, embodiments of the disclosure will be described in detail with reference to the accompanying drawings.

In the following description of embodiments, descriptions of techniques that are well known in the art and not directly related to the present invention are omitted. This is to clearly convey the subject matter of the invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and the manner of achieving them will become apparent with reference to embodiments described in detail below and with reference to the accompanying drawings. The disclosure may, however, be embodied in many different forms and should not be construed as being limited to the embodiments set forth herein. Rather, these embodiments are provided so that the disclosure will be thorough and complete and will fully convey the scope of the disclosure to those skilled in the art. To fully disclose the scope of the disclosure to those skilled in the art, the disclosure is only defined by the scope of claims. In the disclosure, similar reference numbers are used to indicate similar constituent elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable memory medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In the drawings for illustrating a method according to an embodiment, the order of illustration does not necessarily correspond to the order of execution. The order of illustrated steps may be changed, or some steps may be executed in parallel.

Although the disclosure will focus on a wireless communication system for the convenience of description, the disclosure is also applicable to a wired communication system.

Meanwhile, the concept of a cell has been introduced in a wireless system such as 4G/LTE, and a terminal exchanging data with a wireless network may be associated with at least one cell. In addition, the terminal may be associated with two or more cells in a scenario such as coordinated multi point transmission and reception (COMP) or multi-flow. Each cell has a limited coverage, and when the terminal moves out of coverage of a serving cell connected thereto, the terminal may be disconnected from the serving cell and instead connected to another cell. As described above, this process may be referred to as a handover.

However, the handover does not occur immediately and may include procedures and steps on another layer. In a non-limiting example, the terminal should process a reconfiguration command from the network. Also, the terminal prepares low layers, disconnects from the current serving cell, synchronizes with a target cell, and may tune (hereinafter, tuning) an RF chain thereof with the target cell. Then, the terminal may transmit a message indicating completion of handover to the target cell, thus completing the handover procedure.

In case of LTE technology, it may take 50 ms, for example, for the terminal to disconnect from the serving cell and then connect to the target cell for handover. For this time, data transmission is interrupted, so that performance may be degraded. Hereinafter, proposed is a method for solving a problem of performance degradation caused by interrupted data transmission.

Figure 1:
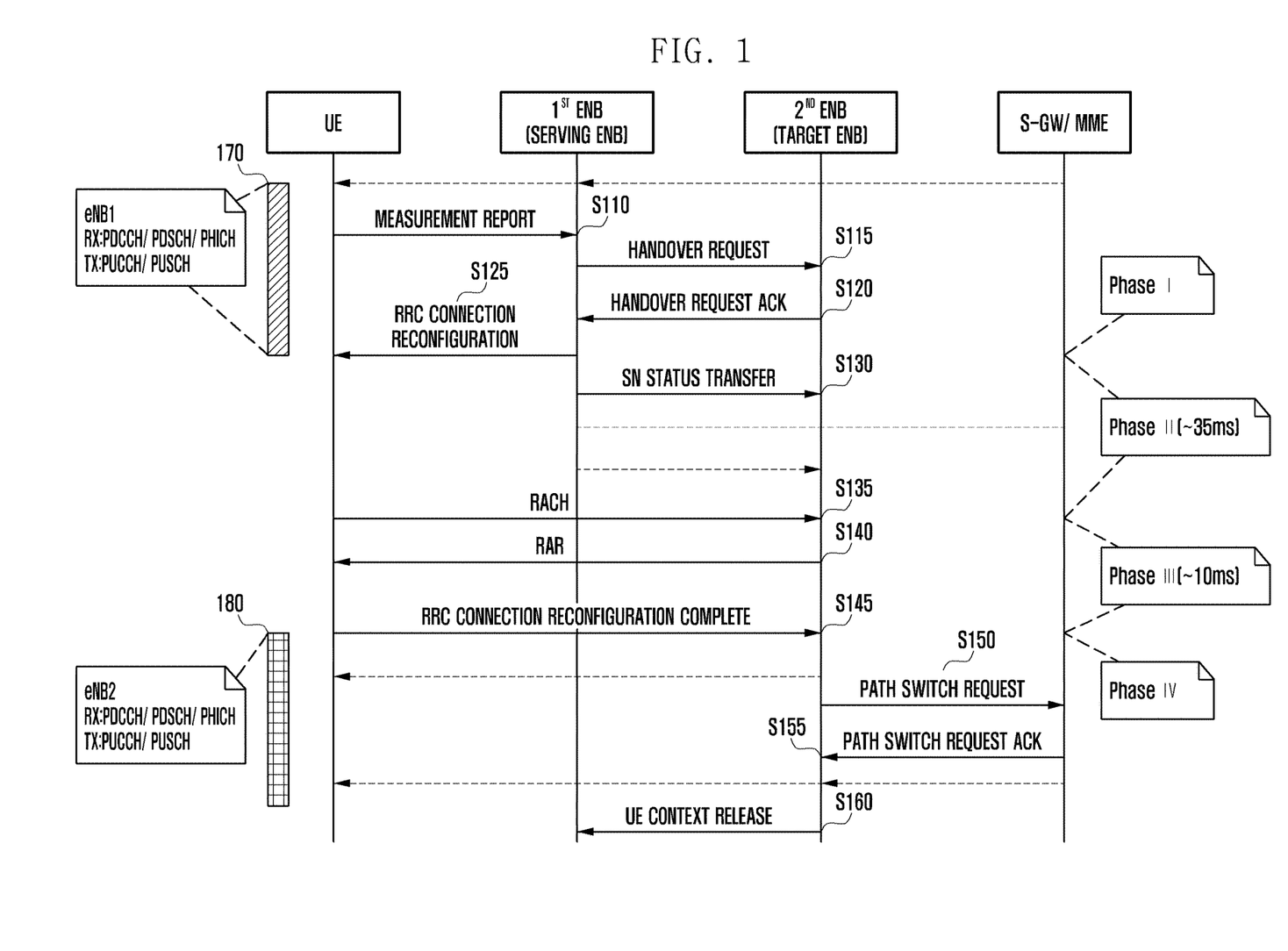
FIG. 1 is a diagram illustrating a handover procedure.

FIG. 1 is a diagram illustrating a handover procedure.

Referring to FIG. 1, at step S110, a terminal (also referred to as UE) may transmit a measurement report to a serving base station (also referred to as a serving eNB). The terminal may receive configuration information on the measurement and configuration information on the measurement report from the base station. The configuration information on the measurement and the configuration information on the measurement report may be received individually or through one message. In addition, such information may be received through a radio resource control (RRC) layer.

The serving base station may receive the measurement report and, based on the measurement report, determine whether to perform a handover. For example, using the signal strength or the like received from the terminal, the serving base station may determine whether to perform a handover. When it is determined that the handover is necessary, the serving base station may transmit a handover request message to a target base station (also referred to as a target eNB) at step S115.

In the disclosure, the serving base station may be also referred to as a first base station (eNB1) or a source base station, and a cell operated by the serving base station may be referred to as a serving cell, a source cell, a first cell, or the like.

In addition, in the disclosure, a target base station may be also referred to as a second base station (eNB2), and a cell operated by the target base station may be referred to as a target cell, a second cell, or the like.

The target base station that receives the handover request message may transmit a handover request acknowledge message to the serving base station at step S120.

In addition, at step S125, the serving base station may transmit a radio resource control (RRC) connection reconfiguration message to the terminal. The RRC connection reconfiguration message may contain information indicating a handover. For example, the RRC connection reconfiguration message may contain a handover command message.

Also, at step S130, the serving base station may transmit a sequence number (SN) status transfer message to the target base station.

Thereafter, the terminal may transmit a random access preamble through a random access channel (RACH) at step S135 and, as a response thereto, receive a random access response (RAR) message at step S140. The terminal may perform uplink synchronization with the target base station through the above process. In addition, for downlink synchronization with the target base station, the terminal may receive a downlink synchronization signal before transmitting the random access preamble.

Also, at step S145, the terminal may transmit an RRC connection reconfiguration complete message to the second base station.

Therefore, at step S150, the target base station may transmit a path switch request message to a serving gateway (SGW)/mobility management entity (MME).

In addition, at step S155, the target base station may receive a path switch request ack message from the SGW/MME as a response to the request message.

Also, at step S160, the target base station may transmit a UE context release message to the serving base station.

In this procedure, from step S110 to step S125 of FIG. 1 (during a section of hatched bar 170 in FIG. 1), the terminal may receive a signal from the serving base station through a physical downlink control channel (PDCCH), a physical downlink shared channel (PDSCH), or a physical hybrid ARQ indicator (PHICH), and may transmit a signal to the serving base station through a physical uplink control channel (PUCCH) or a physical uplink shared channel (PUSCH). Such signals may include control information or data.

In addition, from step S145 to step S160 of FIG. 1 (during a section of grid bar 180 in FIG. 1), the terminal may receive a signal from the target base station through PDCCH, PDSCH, or PHICH, and may transmit a signal to the target base station through PUCCH or PUSCH.

However, referring to FIG. 1, the terminal cannot transmit or receive a signal to or from both the serving base station and the target base station during a second phase (phase 2 or phase II) and a third phase (phase 3 or phase III) until transmitting the RRC connection reconfiguration complete message after receiving the RRC connection reconfiguration message. That is, while the handover procedure is performed, an interruption delay may occur during the second and third phases of performing RRC reconfiguration, synchronization, and tuning.

In order to cope with the interruption delay of the handover, a new feature called mobility enhancement is being discussed. According to the mobility enhancement, the terminal is capable of continuously exchanging data with the serving cell (or the serving base station) even while performing the synchronization and tuning with the target cell. A detailed method thereof will be described with reference to FIG. 2.

Figure 2:
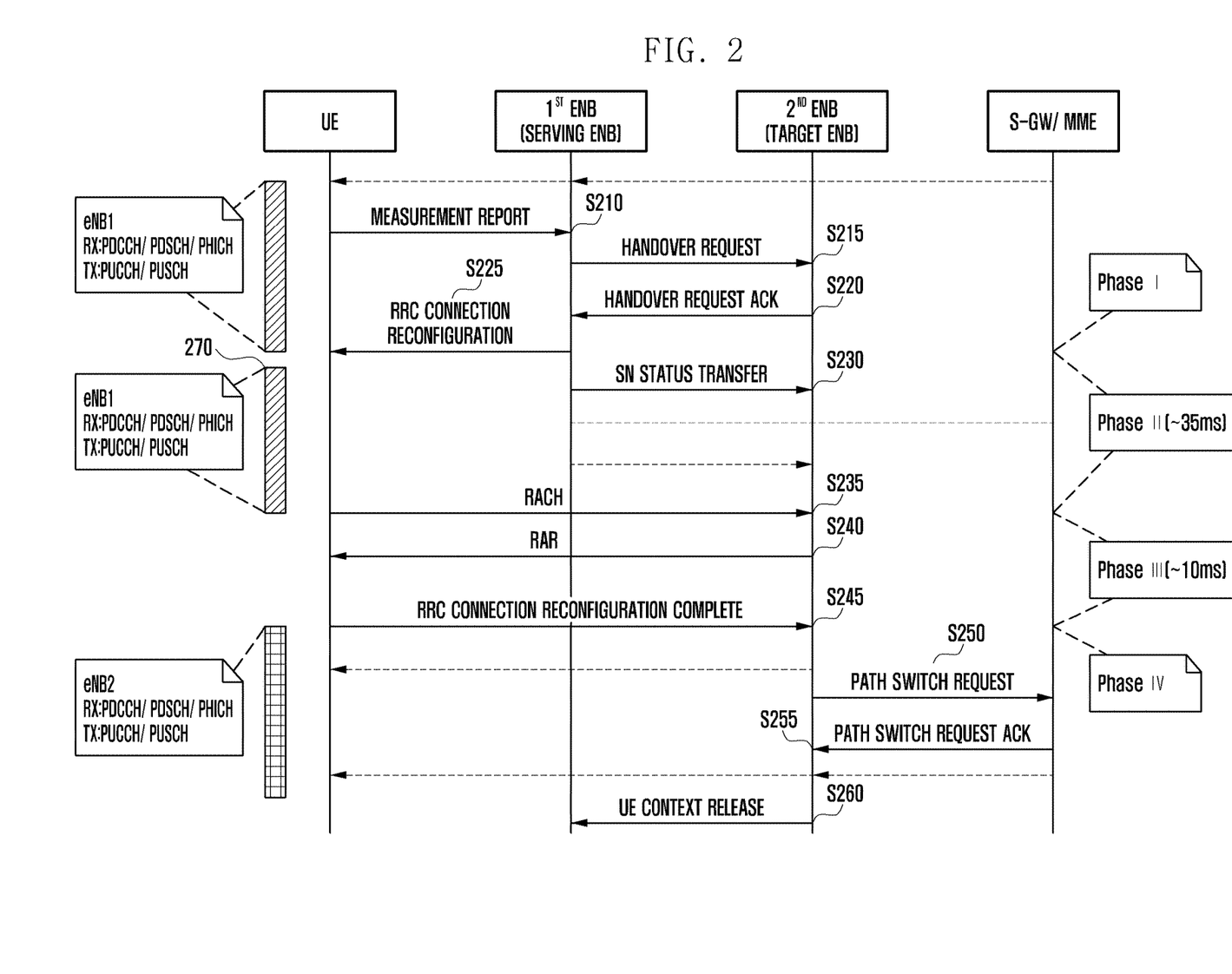
FIG. 2 is a diagram illustrating a handover procedure according to an embodiment of the disclosure.

FIG. 2 is a diagram illustrating a handover procedure according to an embodiment of the disclosure.

Steps S210 to S260 of FIG. 2 are the same as steps S110 to S160 described in FIG. 1, so that detailed descriptions thereof will be omitted.

In comparison with FIG. 1, the terminal may perform communication with the first base station and simultaneously perform synchronization with the second base station during the second phase.

Referring to FIG. 2, even from step S230 to step S235 of FIG. 2 (during a section of hatched bar 270 in FIG. 2), the terminal may receive a signal from the serving base station through PDCCH, PDSCH, or PHICH, and may transmit a signal to the serving base station through PUCCH or PUSCH. Meanwhile, although FIG. 2 shows that the terminal communicates with the serving base station from step S230 to step S235, embodiments of the disclosure are not limited thereto. The terminal may continuously perform communication with the serving base station until transmitting the RRC connection reconfiguration complete message indicating handover completion to the target base station after receiving the RRC connection reconfiguration message for handover from the serving base station.

Specifically, the terminal may check whether there are two or more RF chains. In addition, when having two or more RF chains, and even when receiving the RRC connection reconfiguration message for handover, the terminal may continuously perform communication with the serving base station by using an RF chain (hereinafter, referred to as a first RF chain) through which communication with the serving base station has been performed, and may also perform synchronization and tuning with the target base station (or target cell) by using any one of the remaining RF chains other than the first RF chain. In this case, this RF chain used for performing synchronization and tuning with the target base station may be referred to as a second RF chain, which may mean an RF chain that supports the frequency or bandwidth of the target base station or target cell.

Therefore, if there is no RF chain supporting the frequency or bandwidth of the target base station or target cell even when the terminal has two or more RF chains, the terminal may disconnect from the serving base station and then perform the synchronization and tuning with the target base station by using the first RF chain.

Meanwhile, by performing the synchronization and tuning with the target base station through the second RF chain as described above, the terminal may perform the synchronization and tuning with the target base station while maintaining communication with the serving base station during the phases 2 and 3.

Figure 3:
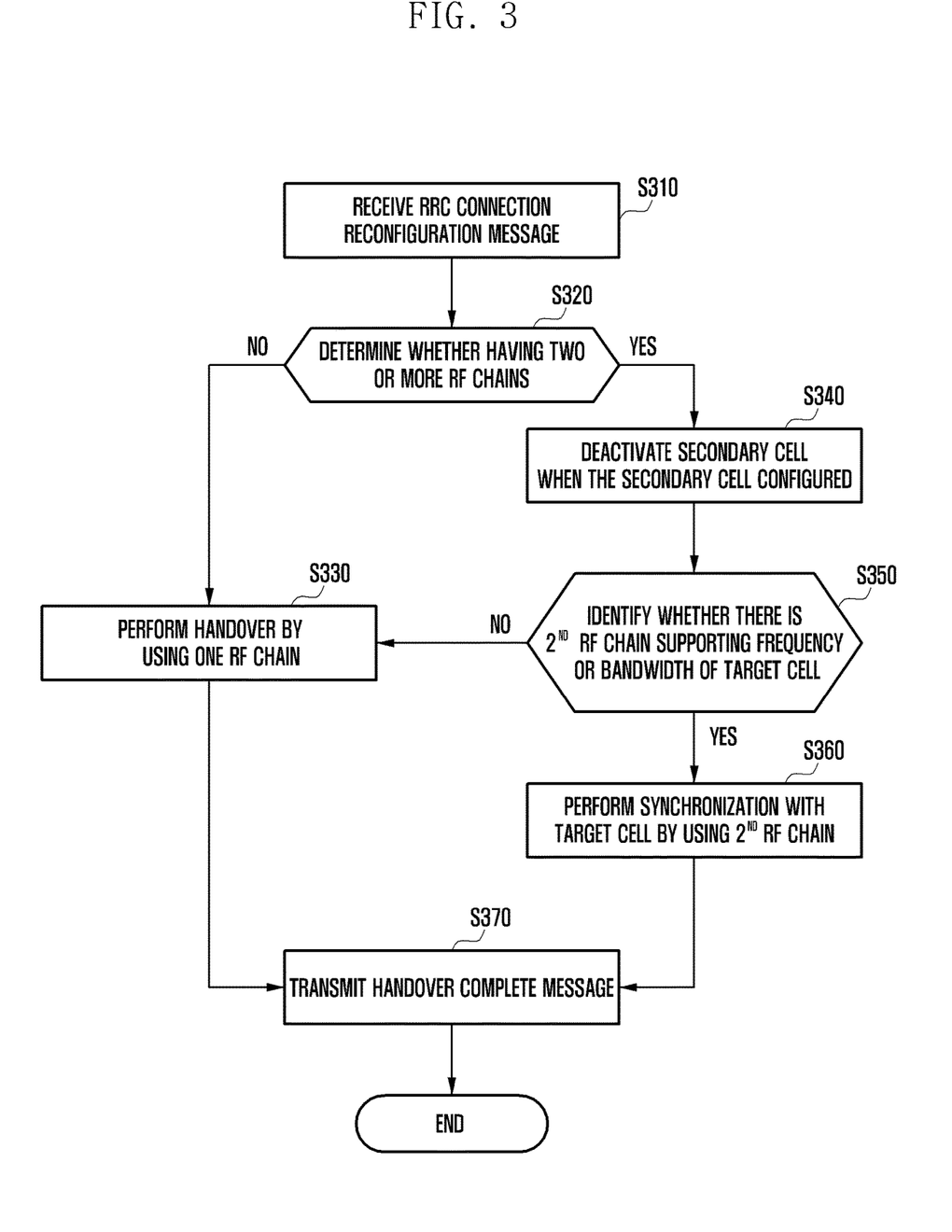
FIG. 3 is a flow diagram illustrating an operation of a terminal according to an embodiment of the disclosure.

FIG. 3 is a flow diagram illustrating an operation of a terminal according to an embodiment of the disclosure.

Referring to FIG. 3, the terminal may transmit and receive a signal to and from a serving cell by using a first RF chain.

At step S310, the terminal may receive an RRC connection reconfiguration message. In addition, the terminal may identify whether the RRC connection reconfiguration message received from a network is for triggering a handover procedure.

In the disclosure, it is assumed that the RRC connection reconfiguration message is for triggering a handover procedure. Thus, the RRC connection reconfiguration message may include a handover command message.

At step S320, the terminal may determine whether the terminal has two or more RF chains. If having one RF chain, the terminal may perform a handover by using one RF chain at step S330. Specifically, when receiving the RRC reconfiguration message while communicating with the serving cell through the first RF chain, the terminal may interrupt transmission/reception of a signal with the serving cell and perform synchronization with the target cell by using the first RF chain.

A detailed handover method is as described in FIG. 1, and thus will be omitted below.

Meanwhile, if having two or more RF chains, the terminal may deactivate a secondary cell at step S340. The terminal may automatically deactivate the secondary cell when receiving a handover command.

However, the step S340 may be performed only when the secondary cell is activated. If the terminal is connected to only one cell, the step S340 may be omitted.

Meanwhile, in the disclosure, the step S320 may be omitted, and the terminal may perform the handover, depending on whether there is a spare RF chain, without separately performing the determination process.

After deactivating the secondary cell, the terminal may identify at step S350 whether there is an RF chain supporting the frequency or bandwidth of the target cell among second RF chains. That is, the terminal may identify whether there is an RF chain capable of performing the synchronization and tuning with the target cell.

As described above, the first RF chain may refer to an RF chain used to transmit and receive a signal to and from the serving cell, and the second RF chain may refer to an RF chain supporting the frequency or bandwidth of the target cell among RF chains excepting the first RF chain. In this case, the first RF chain may refer to an RF chain used to transmit and receive a signal to and from a primary cell (PCell or main carrier) among serving cells.

If there is no second RF chain supporting the frequency or bandwidth of the target cell, the terminal cannot perform synchronization with the target cell by using the RF chain. Therefore, even in case of having a plurality of RF chains, the terminal may return to the step S330 and perform a handover by using the first RF chain. That is, the terminal may interrupt the transmission/reception of a signal with the serving cell and perform the synchronization with the target cell by using the first RF chain.

On the other hand, if there is the second RF chain supporting the frequency or bandwidth of the target cell, the terminal may perform the synchronization with the target cell by using the second RF chain at step S360. At this time, the terminal may perform the synchronization with the target cell through the second RF chain while maintaining the transmission/reception of a signal with the serving cell through the first RF chain.

That is, if connected to two or more cells when a handover command is received, the terminal may deactivate a secondary cell and perform the synchronization with the target cell by using, among RF chains communicating with the secondary cell, an RF chain supporting the frequency or bandwidth of the target cell.

However, embodiments of the disclosure are not limited thereto. In an alternative method, the terminal may perform the synchronization with the target cell by using an RF chain (hereinafter, referred to as a spare RF chain) that is not used for communication with the primary cell and the secondary cell (SCell or subcarrier).

In case of using the above method, the terminal may be connected to two or more cells, and thus two or more RF chains may be used to transmit and receive signals to and from such cells. Therefore, at the step S320, the terminal may identify whether there is a spare RF chain which is an RF chain not used for transmitting and receiving signals to and from the cells. If there is no spare RF chain, the terminal may deactivate all the connected cells (e.g., the primary cell (PCell or main carrier) or at least one secondary cell (SCell or subcarrier)) at the step S330 and perform the synchronization with the target cell by using an RF chain supporting the frequency or bandwidth of the target cell.

On the other hand, if there is the spare RF chain, the terminal may perform the synchronization with the target cell by using any one of the spare RF chains while transmitting and receiving a signal to and from the primary cell by using the first RF chain.

In addition, at step S370, the terminal may transmit a handover complete message. After the handover is completed, the terminal may terminate the connection with the serving cell and transmit/receive a signal to/from the target cell by using the second RF chain.

Meanwhile, when the RRC connection reconfiguration message for handover is constructed and transmitted, the network does not enforce how many RF chains should be used during the handover procedure. That is, the serving base station does not include, in the RRC connection reconfiguration message, the number of RF chains to be used. However, the network may inform the terminal that a plurality of RF chains may be used to perform the handover procedure, and the terminal may determine whether to use the plurality of RF chains.

For example, the network may include, in the RRC connection reconfiguration message to be transmitted to the terminal, 1-bit information indicating whether or not a plurality of RF chains are available, and then the terminal may determine whether to use the plurality of RF chains, based on checking the above information.

However, the above-described method is merely one embodiment. The number of bits of an indicator indicating whether or not a plurality of RF chains are available, and the like may be changed.

Figure 4:
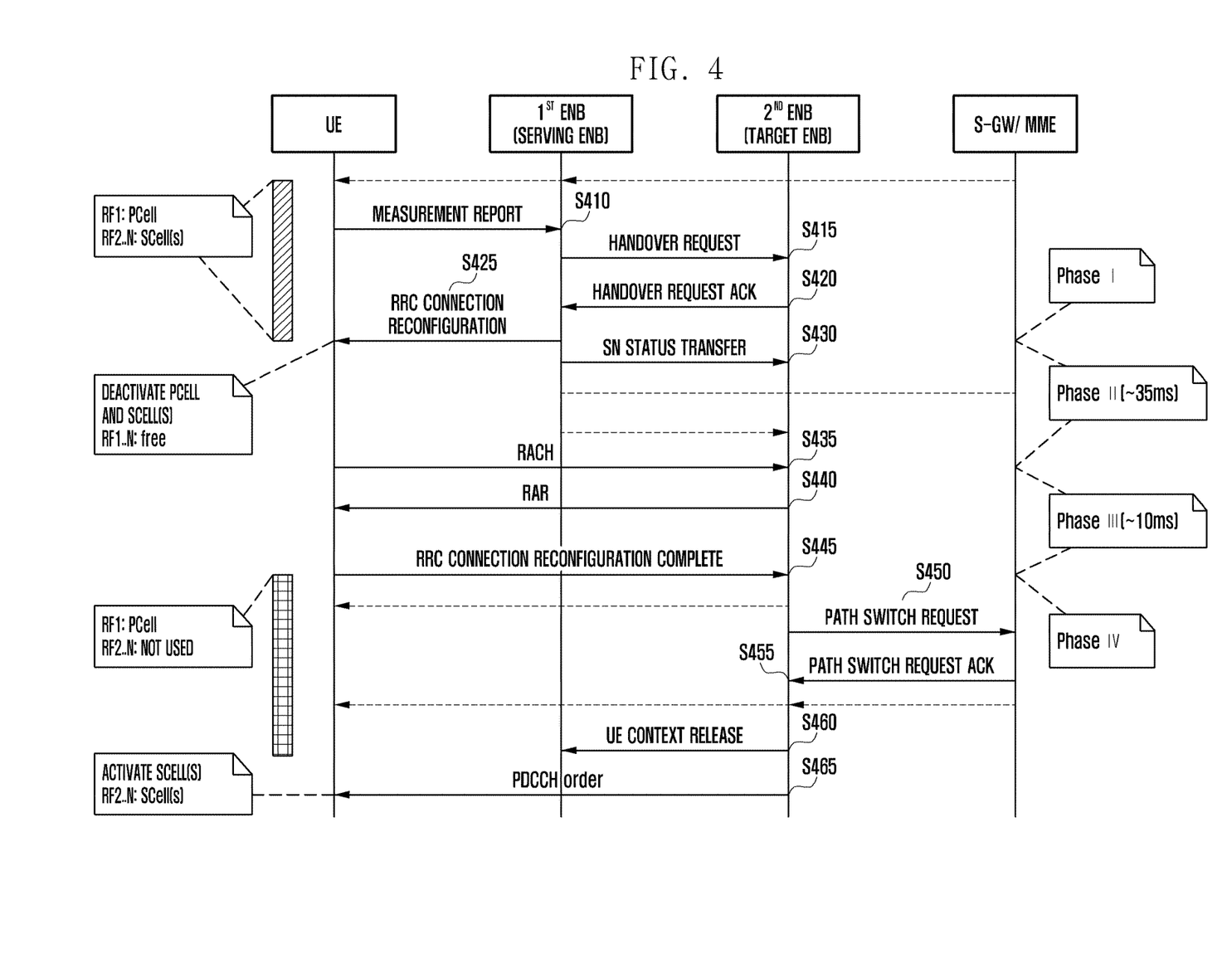
FIG. 4 is a diagram illustrating a method for using an RF chain in a handover procedure.

FIG. 4 is a diagram illustrating a method for using an RF chain in a handover procedure.

Steps S410 to S460 of FIG. 4 are the same as the above-described steps S110 to S160 of FIG. 1, and detailed descriptions thereof will be omitted.

Referring to FIG. 4, the terminal may transmit and receive a signal to and from the serving cell by using the first RF chain. In addition, the terminal may have been connected to two or more cells (i.e., carriers may be aggregated), and thus the terminal may perform communication with the PCell by using the first RF chain and also perform communication with the SCell by using at least one of the remaining RF chains (RF chain 2 to RF chain n).

In case of carrier aggregation, inter-frequency carriers or intra-frequency carriers may be aggregated. The PCell may refer to a carrier operated by the serving base station, and the subcarrier may refer to a carrier operated by the serving base station or another base station.

When receiving the RRC connection reconfiguration message at step S425, the terminal may deactivate the serving cell. If connected to the PCell and the SCell, the terminal may deactivate both the PCell and SCell. That is, the terminal may deactivate all cells including the PCell, so that all RF chains (RF chain 1 to RF chain n) do not transmit/receive signals to/from cells and thus can be freely used.

Thereafter, the terminal may perform synchronization and tuning with the target base station by using the first RF chain. In addition, at step S445, the terminal may transmit the RRC connection reconfiguration message to the target base station. Also, the terminal may perform communication with the target base station by using the first RF chain.

Meanwhile, although it is described in this figure that the terminal uses the first RF chain, which has been used for transmitting and receiving signals to and from the serving cell, in performing synchronization with the target base station, embodiments of the disclosure are not limited thereto. Because all RF chains are freely available after all cells are deactivated, any one RF chain may be used for synchronization with the target base station.

In addition, when carriers are not aggregated, the remaining RF chains (RF chain 2 to RF chain N) may not be used.

Thereafter, when the subcarrier is activated through a PDCCH command (PDCCH order) at step S465, the terminal may transmit and receive a signal to and from the SCell by using at least one of RF chains excepting the RF chain used for communication with the target base station.

Figure 5A:
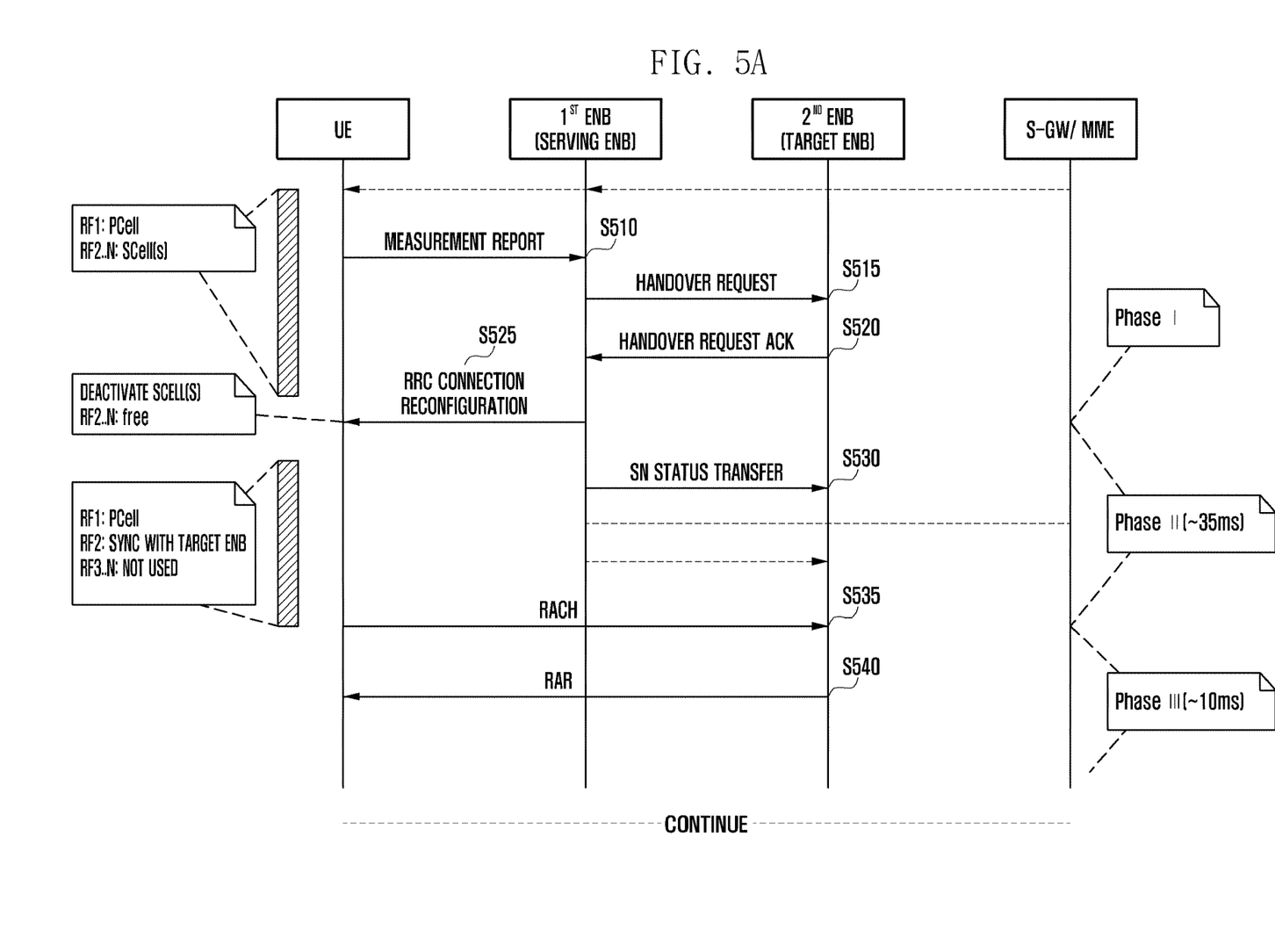
FIG. 5 is a diagram illustrating a method for using an RF chain in a handover procedure according to an embodiment of the disclosure.
Figure 5B:
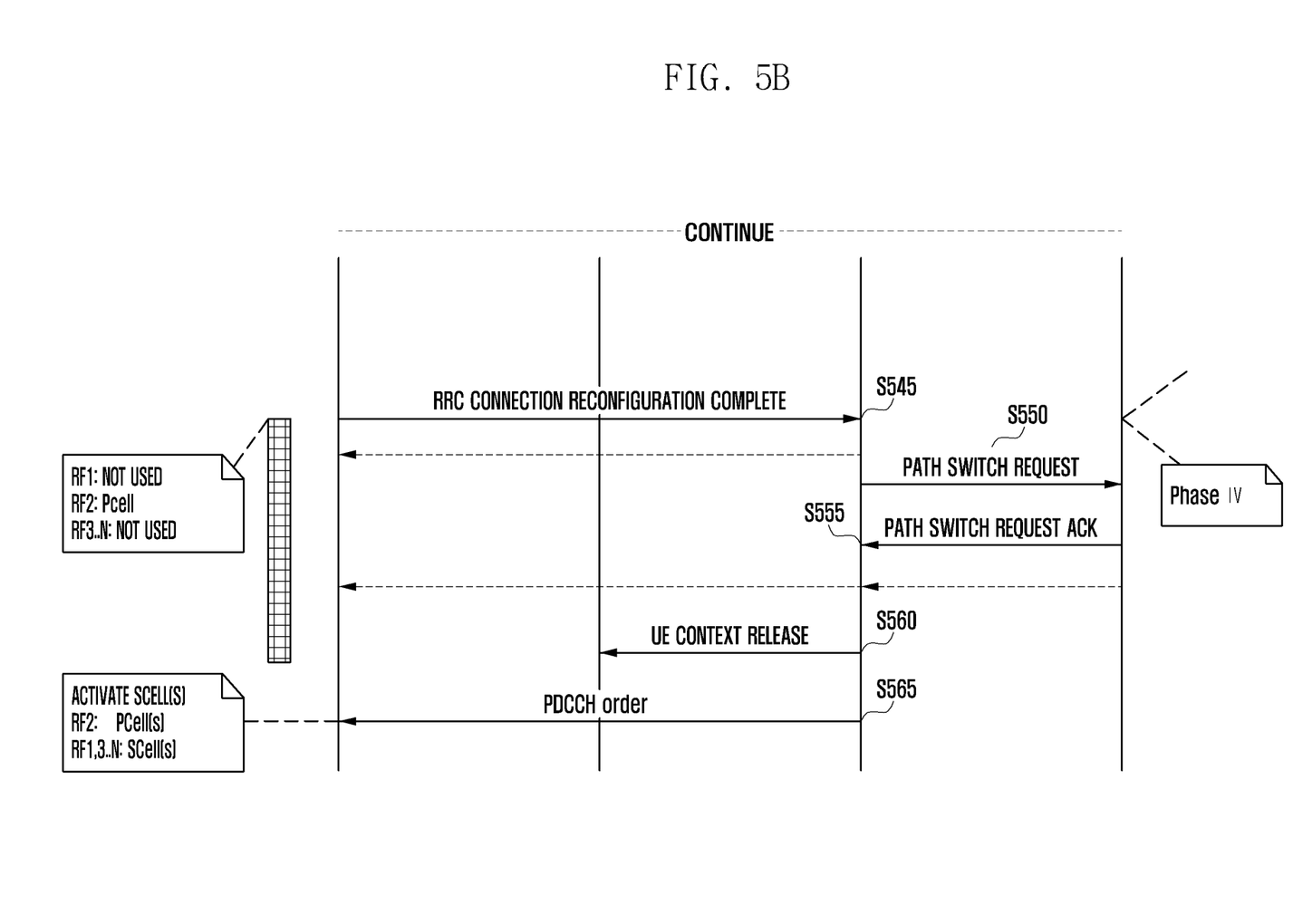

FIG. 5 is a diagram illustrating a method for using an RF chain in a handover procedure according to an embodiment of the disclosure.

Steps S510 to S560 of FIG. 5 are the same as the above-described steps S110 to S160 of FIG. 1, and detailed descriptions thereof are omitted.

Referring to FIG. 5, the terminal may transmit and receive a signal to and from the serving cell by using the first RF chain. In addition, the terminal may have been connected to two or more cells (i.e., carriers may be aggregated), and thus the terminal may perform communication with the PCell by using the first RF chain and also perform communication with the SCell by using at least one of the remaining RF chains (RF chain 2 to RF chain n).

In case of carrier aggregation, inter-frequency carriers or intra-frequency carriers may be aggregated. The PCell may refer to a carrier operated by the serving base station, and the subcarrier may refer to a carrier operated by the serving base station or another base station.

When receiving the RRC connection reconfiguration message at step S525, the terminal may deactivate the serving cell. However, in case of no carrier aggregation, that is, when the terminal is not connected to the SCell, the SCell deactivation step may be omitted. As such, the terminal may deactivate cells other than the serving cell, so that RF chain 2 to RF chain n excepting RF chain 1 used for signal transmission/reception with the serving cell do not transmit/receive signals to/from cells and thus can be freely used.

As described above, in the disclosure, the terminal does not deactivate the PCell contrary to FIG. 4 even when receiving the RRC connection reconfiguration message. Thus, the terminal may continue communication with the serving base station through the PCell by using the first RF chain, and simultaneously perform synchronization with the target base station by using the second RF chain. In this case, using any one of RF chains that have been used for transmitting and receiving signals to and from deactivated cells, the terminal may perform the synchronization with the target base station. Alternatively, using any one of spare RF chains, the terminal may perform the synchronization with the target base station. However, the disclosure is not limited thereto. The synchronization process of the disclosure may include a series of processes for connecting the terminal to the target base station. Also, RF chains other than the first and second RF chains may not be used.

Thereafter, the terminal may perform synchronization and tuning with the target base station and then transmit the RRC connection reconfiguration message to the target base station at step S545. In this case, the terminal may transmit the RRC connection reconfiguration complete message through the main carrier of the target base station by using the second RF chain and then perform communication with the target base station.

In addition, after the handover is completed, the terminal may release the connection with the serving base station and may not use the first RF chain that has been used for communication with the serving base station.

Also, when carriers are not aggregated as described above, the remaining RF chains (RF chain 3 to RF chain N) may not be used.

However, when the subcarrier is activated through a PDCCH command (PDCCH order) at step S565, at least one of the remaining RF chains (RF chain 1, RF chain 3 to RF chain N) may be used for communication with the SCell.

Figure 6:
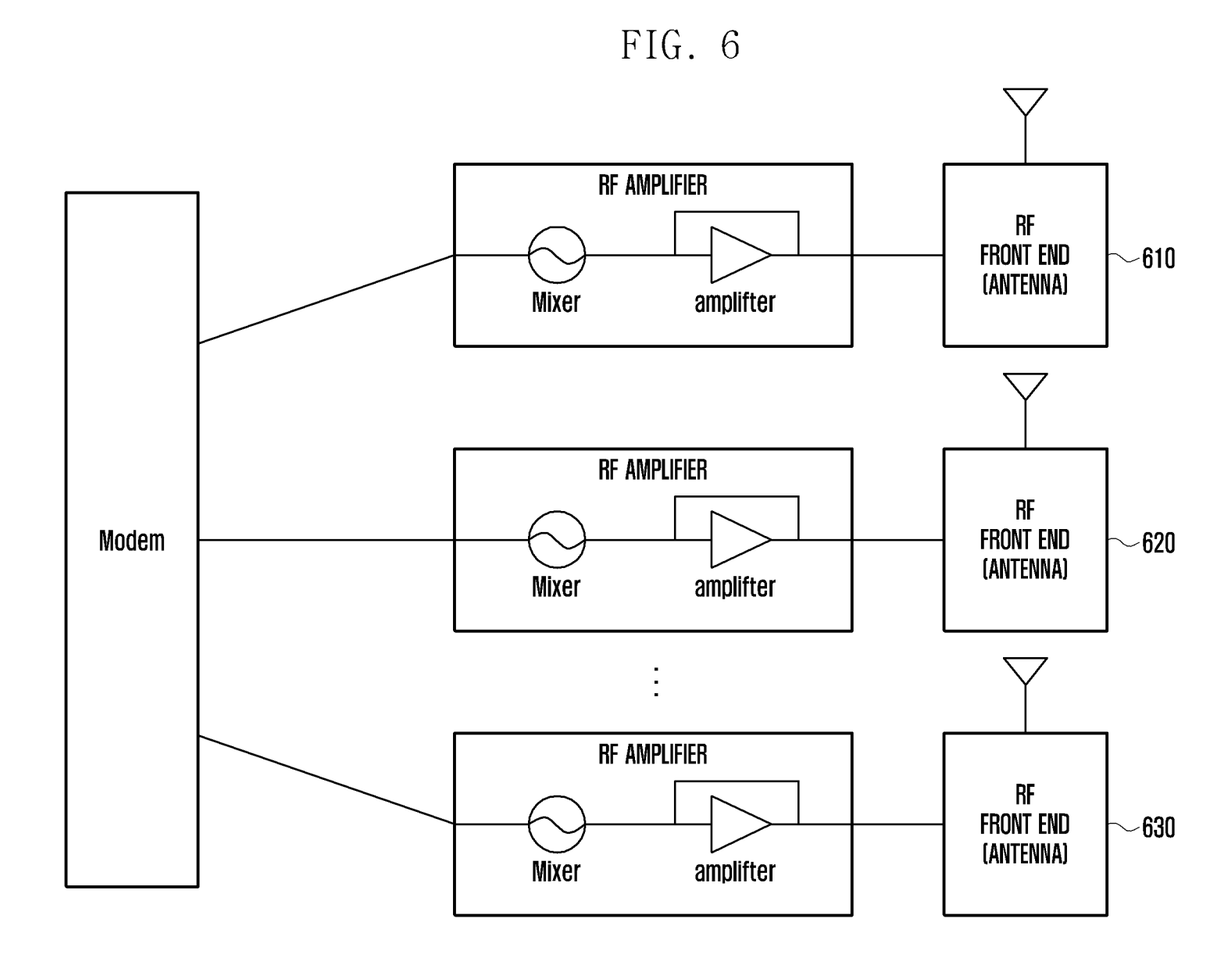
FIG. 6 is a diagram illustrating an RF chain of a terminal according to an embodiment of the disclosure.

FIG. 6 is a diagram illustrating an RF chain of a terminal according to an embodiment of the disclosure.

Referring to FIG. 6, the terminal may have at least one RF chain.

As described above, in case of having one RF chain, when receiving a handover command, the terminal may deactivate a serving cell and perform synchronization with a target base station by using the RF chain. In addition, even in case of having two or more RF chains, when each RF chain is used for signal transmission and reception with PCell or SCell by carrier aggregation, the terminal may deactivate both the PCell and the SCell and perform the communication with the target base station by using the RF chain.

On the other hand, in case of having two or more RF chains as shown in FIG. 6, the terminal may transmit and receive a signal to and from the serving cell by using a first RF chain 610 and simultaneously perform synchronization with the target cell by using a second RF chain 620.

Specifically, when determining that a handover is necessary according to the movement of the terminal, the terminal may receive a handover command from the serving base station. Thereafter, the terminal may transmit/receive a signal to/from the serving cell by using the first RF chain 610 without deactivating the serving cell and simultaneously perform synchronization with the target base station (or target cell) by using the second RF chain 620. However, when the terminal is connected to a plurality of cells as described above, the terminal may deactivate the remaining cells (SCell) except the PCell and perform synchronization with the target base station by selecting any one of RF chains that have been used to transmit and receive signals to and from the deactivated SCell.

In addition, when the synchronization is completed, the terminal may release connection with the serving cell (or deactivate the serving cell) and then communicate with the target base station by using the second RF chain 620.

Figure 7:
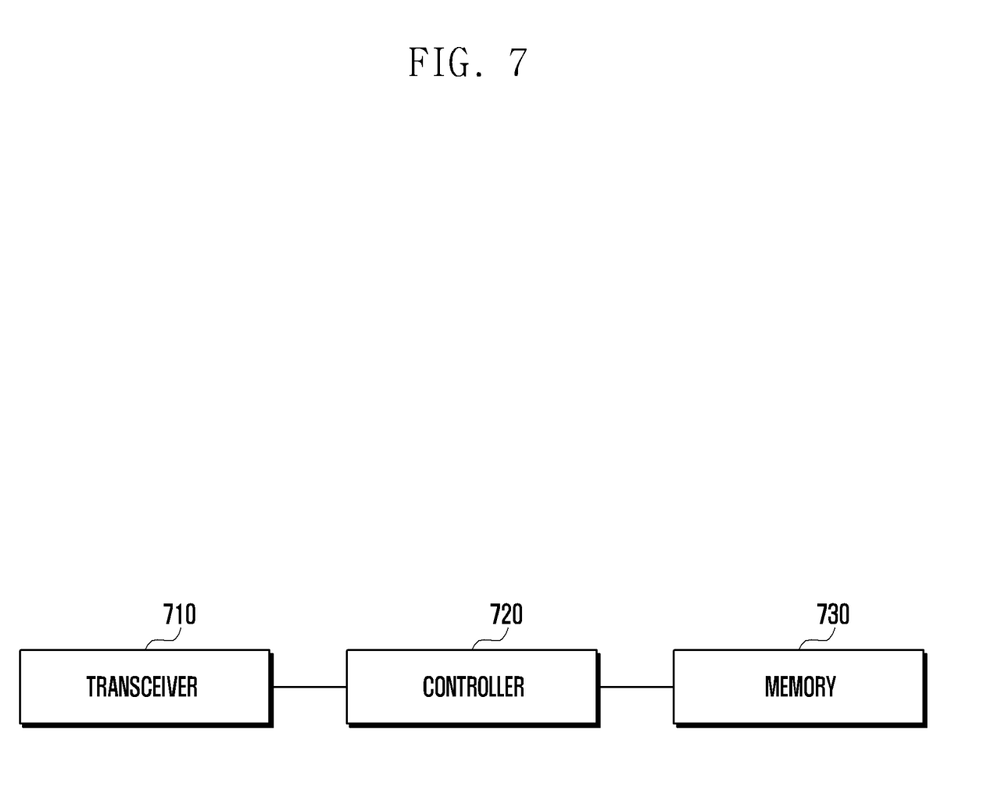
FIG. 7 is a diagram illustrating a structure of a terminal according to an embodiment of the disclosure.

FIG. 7 is a diagram illustrating a structure of a terminal according to an embodiment of the disclosure.

Referring to FIG. 7, the terminal may include a transceiver 710, a controller 720, and a memory 730.

The transceiver 710 may transmit and receive a signal to and from any other network entity. For example, the transceiver 710 may transmit and receive a signal to and from a base station. The transceiver 710 may transmit a measurement report to the base station and also receive an RRC connection reconfiguration message for a handover from the base station. In addition, the transceiver 710 may transmit a signal for performing synchronization to the base station and also transmit a handover complete message to the base station when the handover is completed.

The controller 720 may control the whole operation of the terminal and particularly control the terminal to perform the operations described in the above embodiments. In addition, the controller 720 may include at least one processor. The processor may be controlled by a program that includes instructions for executing the methods described in the embodiments of the disclosure. In addition, the program may be stored in a memory medium, and the memory medium may include a volatile or nonvolatile memory. The memory may be a medium capable of storing data, and there is no limitation in the form of such medium when the instructions can be stored.

The controller 720 may transmit and receive a signal to and from a serving cell by using a first RF chain. In addition, the controller 720 may receive an RRC connection reconfiguration message. Also, the controller 720 may identify whether the RRC connection reconfiguration message received from a network is for triggering a handover procedure.

The controller 720 may determine whether the terminal has two or more RF chains. If the terminal has one RF chain, the controller 720 may perform a handover by using one RF chain. Specifically, when receiving the RRC reconfiguration message while communicating with a serving cell through the first RF chain, the controller 720 may interrupt transmission/reception of a signal with the serving cell and perform synchronization with a target cell by using the first RF chain.

Meanwhile, if the terminal has two or more RF chains, the controller 720 may deactivate a secondary cell. The terminal may automatically deactivate the secondary cell when receiving a handover command.

However, the controller 720 may deactivate the secondary cell when the secondary cell is set. If the terminal is connected to only one cell, the above process may be omitted.

The controller 720 may identify whether there is an RF chain supporting the frequency or bandwidth of the target cell among second RF chains. That is, the controller 720 may identify whether there is an RF chain capable of performing the synchronization and tuning with the target cell.

As described above, the first RF chain may refer to an RF chain used to transmit and receive a signal to and from the serving cell, and the second RF chain may refer to an RF chain supporting the frequency or bandwidth of the target cell among RF chains excepting the first RF chain. In this case, the first RF chain may refer to an RF chain used to transmit and receive a signal to and from a primary cell among serving cells.

If there is no second RF chain supporting the frequency or bandwidth of the target cell, the controller 720 cannot perform synchronization with the target cell by using the RF chain. Therefore, even in case of having a plurality of RF chains, the controller 720 may perform a handover by using the first RF chain. That is, the terminal may interrupt the transmission/reception of a signal with the serving cell and perform the synchronization with the target cell by using the first RF chain.

On the other hand, if there is the second RF chain supporting the frequency or bandwidth of the target cell, the controller 720 may perform synchronization with the target cell by using the second RF chain. At this time, the controller 720 may perform the synchronization with the target cell through the second RF chain while maintaining the transmission/reception of a signal with the serving cell through the first RF chain. That is, if the terminal is connected to two or more cells when a handover command is received, the controller 720 may deactivate the secondary cell and perform the synchronization with the target cell by using, among RF chains communicating with the secondary cell, an RF chain supporting the frequency or bandwidth of the target cell.

However, embodiments of the disclosure are not limited thereto. In an alternative method, the controller 720 may perform the synchronization with the target cell by using an RF chain (hereinafter, referred to as a spare RF chain) that is not used for communication with the primary cell and the secondary cell (SCell or subcarrier).

In case of using the above method, the terminal may be connected to two or more cells, and thus two or more RF chains may be used to transmit and receive signals to and from such cells. Therefore, the controller 720 may identify whether there is a spare RF chain which is an RF chain not used for transmitting and receiving signals to and from the cells. If there is no spare RF chain, the controller 720 may deactivate all the connected cells (e.g., the primary cell (PCell or main carrier) or at least one secondary cell (SCell or subcarrier)) and perform the synchronization with the target cell by using an RF chain supporting the frequency or bandwidth of the target cell.

On the other hand, if there is the spare RF chain, the controller 720 may perform the synchronization with the target cell by using any one of the spare RF chains while transmitting and receiving a signal to and from the primary cell by using the first RF chain.

In addition, the controller 720 may transmit a handover complete message. After the handover is completed, the terminal may terminate the connection with the serving cell and transmit/receive a signal to/from the target cell by using the second RF chain.

Meanwhile, when the RRC connection reconfiguration message for handover is constructed and transmitted, the network does not enforce how many RF chains should be used during the handover procedure. That is, the serving base station does not include, in the RRC connection reconfiguration message, the number of RF chains to be used. However, the network may inform the terminal that a plurality of RF chains may be used to perform the handover procedure, and the terminal may determine whether to use the plurality of RF chains.

For example, the network may include, in the RRC connection reconfiguration message to be transmitted to the terminal, 1-bit information indicating whether or not a plurality of RF chains are available, and then the terminal may determine whether to use the plurality of RF chains, based on checking the above information.

However, the above-described method is merely one embodiment. The number of bits of an indicator indicating whether or not a plurality of RF chains are available, and the like may be changed.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof.

The invention claimed is:

1. A method performed by a terminal in a communication system, the method comprising:
receiving a signal from a primary cell by using a first radio frequency (RF) chain and receiving a signal from a secondary cell by using at least one RF chain among a plurality of RF chains;
receiving, from the primary cell, a message for a handover, the message including an indicator indicating whether the plurality of RF chains are available for the handover;
as a response to reception of the message, deactivating the secondary cell;
in case that the indicator indicates that the plurality of RF chains are available for the handover, identifying a second RF chain supporting a frequency of a target cell among the plurality of RF chains;
performing a synchronization with the target cell by using the second RF chain while transmitting and receiving a signal to and from the primary cell by using the first RF chain; and
receiving, from the target cell, a signal by using the second RF chain after performing the synchronization.

2. The method of claim 1, wherein receiving the signal from the target cell comprises:
releasing a connection with the primary cell after performing the synchronization.

3. The method of claim 1, further comprising:
in case that the indicator indicates that the plurality of RF chains are not available for the handover, deactivating the primary cell; and
performing the synchronization with the target cell by using the first RF chain.

4. The method of claim 1, wherein the second RF chain is identified based on the plurality of RF chains supporting the frequency or a bandwidth of the target cell.

5. The method of claim 1, wherein the message for the handover is included in a radio resource control (RRC) connection reconfiguration message.

6. The method of claim 1, further comprising:
receiving a physical downlink control channel (PDCCH) command for activating the secondary cell; and
receiving a signal from the secondary cell by using one of remaining RF chains except the second RF chain.

7. A terminal in a communication system, the terminal comprising:
a transceiver; and
a controller coupled with the transceiver and configured to:
receive a signal from a primary cell by using a first radio frequency (RF) chain and receive a signal from a secondary cell by using at least one RF chain among a plurality of RF chains,
receive, from the primary cell, a message for a handover, the message including an indicator indicating whether the plurality of RF chains are available for the handover,
as a response to reception of the message, deactivate the secondary cell,
in case that the indicator indicates that the plurality of RF chains are available for the handover, identify a second RF chain supporting a frequency of a target cell among the plurality of RF chains,
perform a synchronization with the target cell by using the second RF chain while transmitting and receiving a signal to and from the primary cell by using the first RF chain, and
receive, from the target cell, a signal by using the second RF chain after performing the synchronization.

8. The terminal of claim 7, wherein the controller is configured to:
release a connection with the primary cell after performing the synchronization.

9. The terminal of claim 7, wherein the controller is further configured to:
in case that the indicator indicates that the plurality of RF chains are not available for the handover, deactivate the primary cell, and
perform the synchronization with the target cell by using the first RF chain.

10. The terminal of claim 7, wherein the second RF chain is identified based on the plurality of RF chains supporting the frequency or a bandwidth of the target cell.

11. The terminal of claim 7, wherein the message for the handover is included in a radio resource control (RRC) connection reconfiguration message.

12. The terminal of claim 7, wherein the controller is further configured to:
receive a physical downlink control channel (PDCCH) command for activating the secondary cell, and
receive a signal from the secondary cell by using one of remaining RF chains except the second RF chain.

* * * * *